INVENTOR.
Thomas M. Herbert.
BY
Wm. R. Glisson
ATTORNEY

June 4, 1963  T. M. HERBERT  3,092,211
RAILWAY DISK BRAKES
Filed June 23, 1960  3 Sheets-Sheet 2

INVENTOR.
Thomas M. Herbert.
BY
Wm. R. Glisson
ATTORNEY

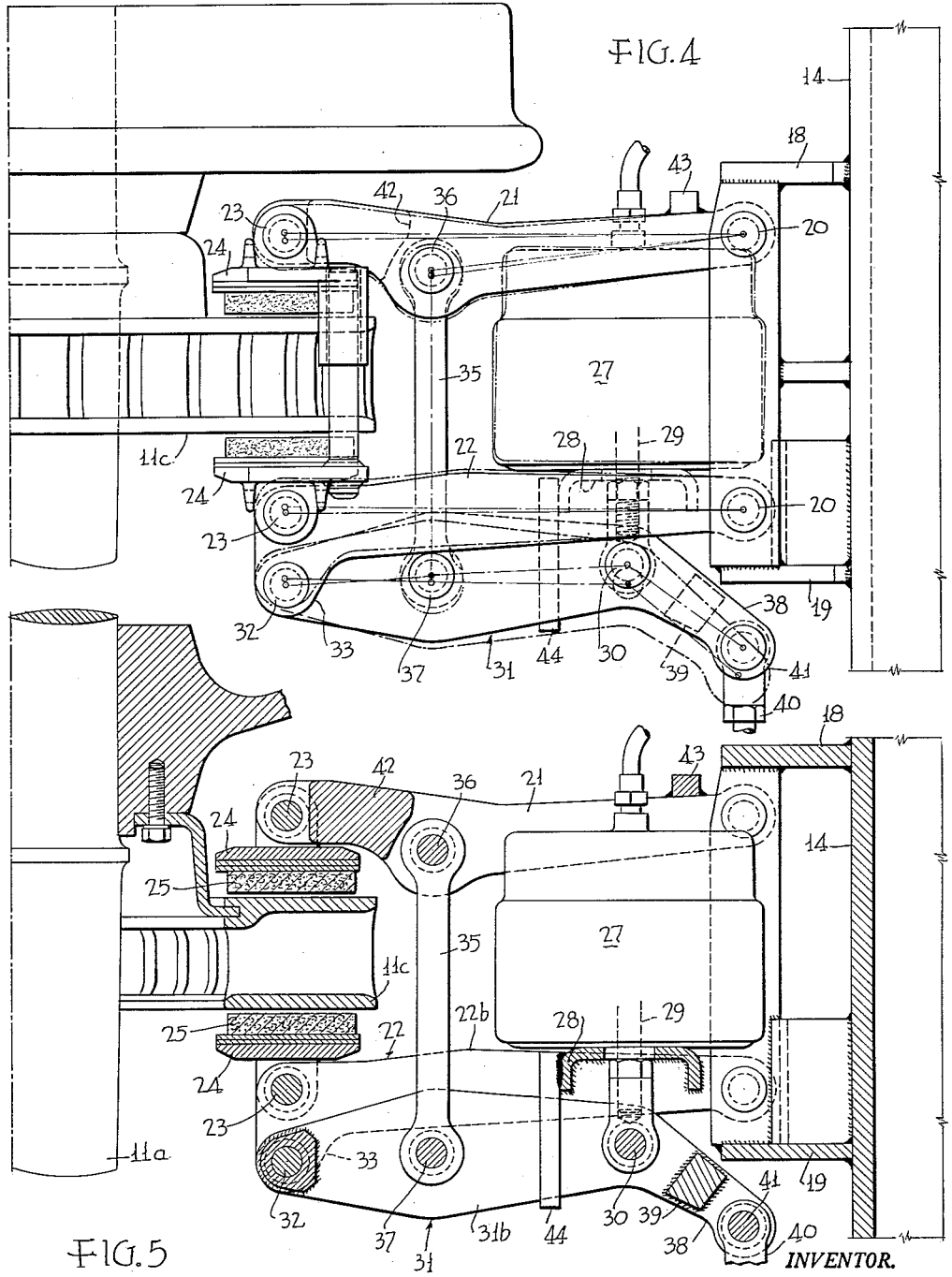

3,092,211
RAILWAY DISK BRAKES
Thomas M. Herbert, Huntingdon Valley, Pa., assignor to The Budd Company, Philadelphia, Pa., a corporation of Pennsylvania
Filed June 23, 1960, Ser. No. 38,258
4 Claims. (Cl. 188—59)

This invention relates to disk brakes and has for an object the provision of improvements in this art.

One of the particular objects of the invention is to provide a simple, inexpensive, dependable and durable brake assembly.

Another object is to provide an assembly in which a power device is mounted on one of two shoe mounting and operating arms and actuates a lever which is pivoted to the mounting arm and connected with the other arm by a link.

Another object is to provide such an assembly with a hand or emergency operating connection.

The above and other objects and advantages of the invention will be apparent from the following description of an exemplary embodiment, reference being made to the accompanying drawings wherein:

FIG. 4 is an enlarged top plan view; and

FIG. 5 is a horizontal section taken on the line 5—5 of FIG. 2.

Figure 1:
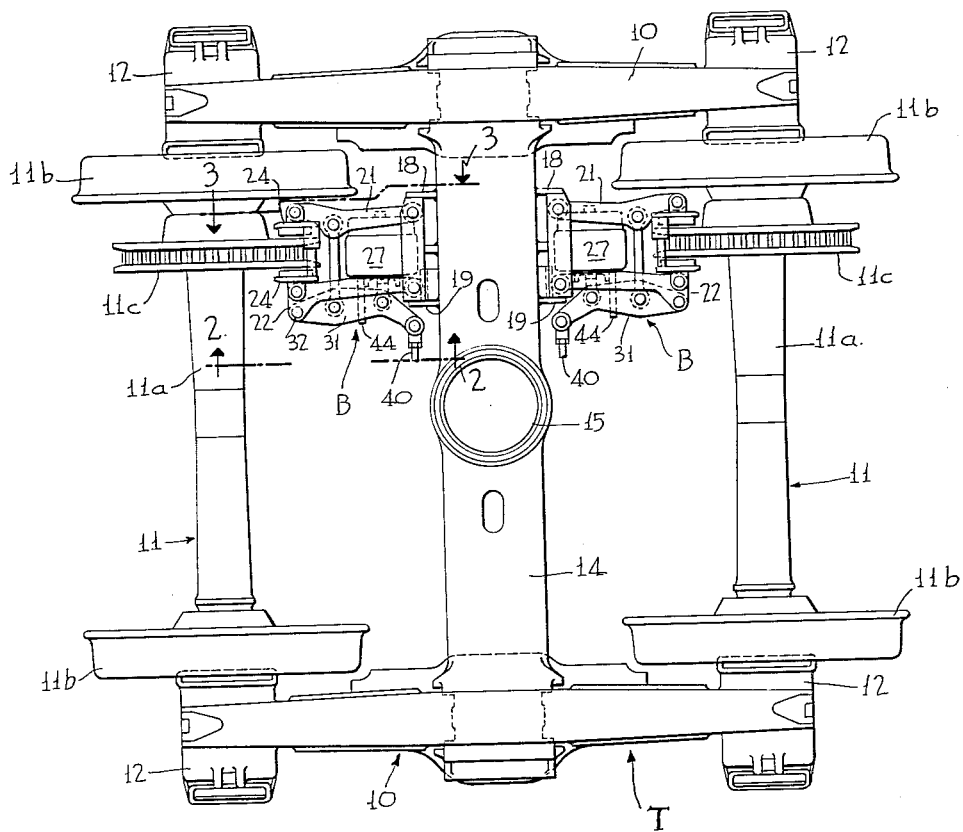
FIG. 1 is a top plan view of a truck provided with brakes according to the present invention.
Figure 2:
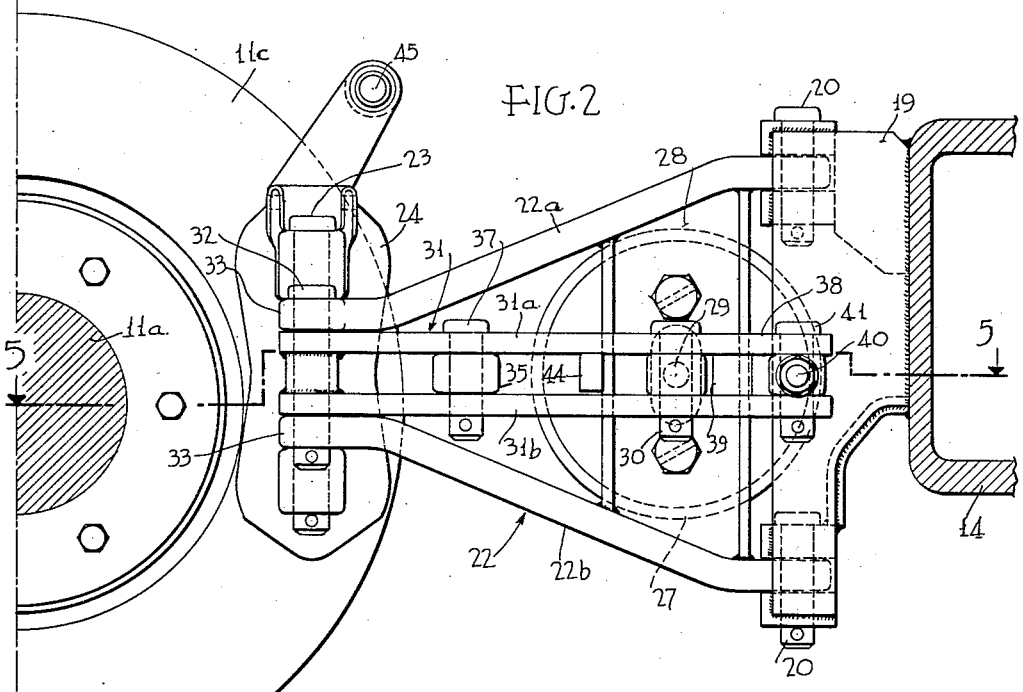
FIG. 2 is an enlarged side elevation of one of the brake assemblies, the view being taken on the line 2—2 of FIG. 1.
Figure 3:
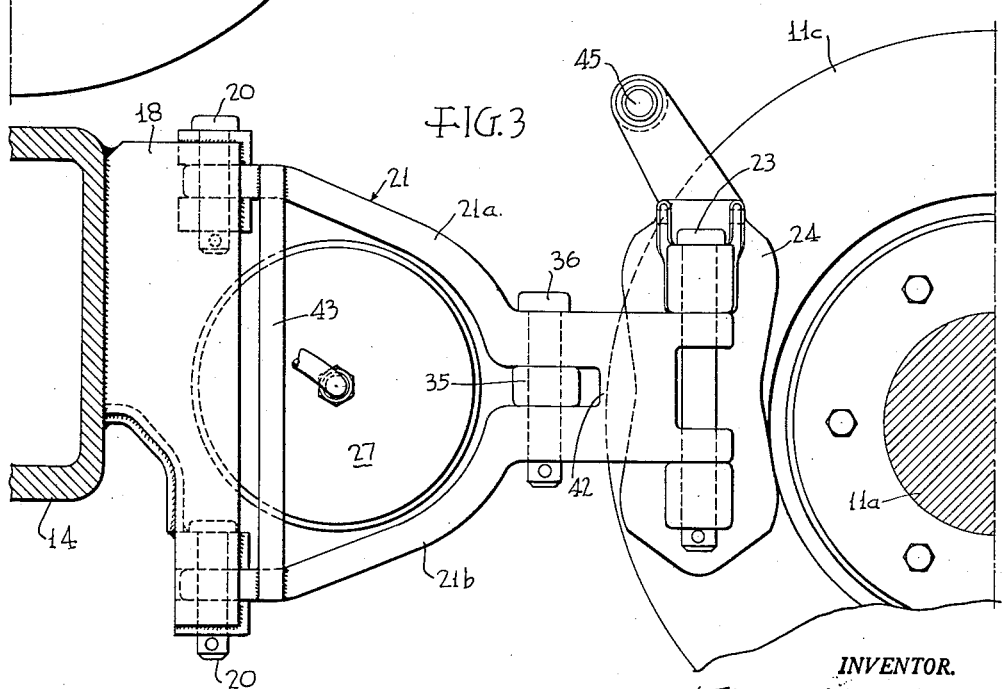
FIG. 3 is an enlarged side elevation taken on the line 3—3 of FIG. 1.

A railway truck T includes side frames 10, wheel-axle units 11 having bearings 12, a bolster 14 having a center joint 15 and brake assemblies B mounted on the bolster. The wheel-axle unit includes an axle 11a, wheels 11b and brake disks 11c. The bearings 12 and the bolster mounting on springs on the side frames are such as to hold the truck securely together.

Each brake assembly, one for each brake disk 11c, includes brackets 18 and 19 secured, as by welding, outboard and inboard respectively, on the bolster. The brackets carry supports for pivot pins 20 swingably mounting support arms 21, 22 for brake operating mechanism. At their outer ends the arms 21, 22 have hinged thereon by pivot pins 23 the brake shoes 24 which carry lining 25 cooperating with the radial side faces of the disk 11c.

Brake operating power means are mounted on one of the support arms, here a cylinder 27 of a fluid power device being mounted on the U-shaped connecting member 28 secured, as by welding to the upper and lower portions 22a, 22b of the right support arm 22. A piston rod 29 of a piston operating in the cylinder 27 is connected by a pivot pin 30 to an operating lever 31 which is fulcrumed on a pivot pin 32 at the outer end of the support lever 22. The operating lever includes paired elements 31a and 31b and the pin 32 is carried by paired projections 33 secured, integrally or by welding, to the back of the arm elements 22a, 22b.

Intermediately a link 35 is connected by pivot pins 36 and 37 respectively to the support arm 21 and to the operating lever 31 so that when the lever 31 presses one shoe against the disk the other shoe carried by the support arm 21 is pressed against the other side of the disk. The inner end of the lever 31 extends beyond the power device as at 38 with a connecting member 39 and has a hand brake operating element 40 pivotally connected thereto by a pin 41.

The upper and lower portions 21a, 21b of support arm 21 are connected at their outer ends by a member 42, which may be integral or welded in, and the inner ends are connected by a member 43.

The upper part 31a of lever 31 is slidably supported by a guide support 44 secured, as by welding, to one side of the member 28 which connects the arm elements 22a, 22b. This keeps weight off the piston rod especially helpful in case a diaphragm is used in the cylinder.

The usual guide 45 between projections from the shoes is provided.

It is thus seen that the invention provides simple, effective and durable brake operating means mounted on a bolster.

While one embodiment of the invention has been described for purposes of illustration it is to be understood that there may be various embodiments and modifications within the general scope of the invention.

What is claimed is:

1. In a disk brake for a railway truck having a wheel-axle assembly provided with a brake disk, the combination of: a support bracket adapted to be mounted on the truck frame at a point spaced longitudinally from the brake disk; a pair of brake shoes adapted to be disposed on opposite sides of said brake disk for braking the brake disk; a pair of substantially parallel, laterally-spaced, longitudinally-extending support arms for actuating said brake shoes, each of said support arms having one end pivotally connected to said support bracket and having its other end pivotally connected to the associated brake shoe via first pivot pin means; second pivot pin means mounted on said other end of one of said support arms at a point spaced laterally from the associated first pivot pin means; an operating lever pivoted at one end on said second pivot pin means and extending longitudinally and substantially parallel to said one support arm on the side away from the other support arm; a transverse pull link pivotally connected at its ends to medial portions of said operating lever and said other support arm whereby movement of said operating lever moves said pull link and said support arms; and means for moving said operating lever comprising a cylinder mounted on said one support arm on the side thereof adjacent to said other support arm and between said pull link and said support bracket, and an operating rod which extends through an aperture in said one support arm and is pivotally connected to said operating lever adjacent the other end thereof; said operating rod being operative upon actuation thereof to move said operating lever both to apply and to release the brakes, the axis of said cylinder and said operating rod being coincident and extending substantially perpendicular to said one support arm and said operating lever.

2. A disk brake in accordance with claim 1 wherein said operating lever is provided with a downwardly facing bearing surface, and said disk brake further includes a guide support secured at one end to said one support arm and having an upwardly facing surface slidingly engaging said bearing surface whereby the weight of said operating lever is kept off said operating rod and is supported by said guide support.

3. A disk brake in accordance with claim 1 wherein the other end of said operating lever extends beyond said operating rod and is adapted to be connected to a hand operating element.

4. In a compact, removable disk brake assembly for use on a railway truck having a brake disk and a support bracket mounted on the truck frame at a point spaced longitudinally of said brake disk, the combination of: a pair of brake shoes adapted to be disposed on opposite sides of the brake disk; removable first pivot pin means adapted to detachably mount said assembly on the truck; a pair of substantially parallel, longitudinally-extending, laterally-spaced support arms adapted to be pivotally connected at one end to the support bracket via said first pivot pin means; second pivot pin means carried by the other ends of said support arms, said brake shoes being pivoted on said second pivot pin means whereby pivotal movement of said support arms is adapted to swing said brake shoes towards and away from the brake disk; third pivot pin means carried by one of said support arms and located laterally of the associated said second pivot pin means; an operating lever pivoted at one end on said third pivot pin means and extending along one side of and substantially parallel to said one support arm on the side thereof opposite to said other support arm; a pull link having its ends pivotally connected to medial portions of said other support arm and said operating lever whereby pivotal movement of said operating lever pivots said support arms; and a brake cylinder actuator comprising a cylinder mounted on said one support arm on the side thereof opposite to said operating lever and adjacent to said other support arm, and an operating rod which extends through and normal to said one support arm and is pivotally connected to said operating lever adjacent the other end thereof so that movement of said operating rod into and out of said cylinder swings said operating lever to apply and to release the brakes, said other support arm being bifurcated to provide clearance for said cylinder whereby the cylinder is located wholly between the inboard and outboard sides of said support arms.

References Cited in the file of this patent
UNITED STATES PATENTS

| | | |
|---|---|---|
| 1,969,114 | Baselt | Aug. 7, 1934 |
| 2,384,129 | Orr et al. | Sept. 4, 1945 |
| 2,656,900 | Tack | Oct. 27, 1953 |
| 2,866,524 | Flesch | Dec. 30, 1958 |
| 2,903,095 | Tack et al. | Sept. 8, 1959 |
| 2,911,070 | Seelig | Nov. 3, 1959 |